United States Patent
Haikarainen et al.

(10) Patent No.: US 9,175,102 B2
(45) Date of Patent: Nov. 3, 2015

(54) PREPARATION OF PRECIPITATED ZN PP CATALYSTS WITH INTERNAL PORE STRUCTURE USING NANOPARTICLES

(75) Inventors: Anssi Haikarainen, Tuusula (FI); Peter Denifl, Helsinki (FI); Timo Leinonen, Tokkinen (FI)

(73) Assignee: BOREALIS AG, Vienna (AT)

( * ) Notice: Subject to any disclaimer, the term of this patent is extended or adjusted under 35 U.S.C. 154(b) by 4 days.

(21) Appl. No.: 13/266,821

(22) PCT Filed: Apr. 30, 2010

(86) PCT No.: PCT/EP2010/055885
§ 371 (c)(1),
(2), (4) Date: Nov. 30, 2011

(87) PCT Pub. No.: WO2010/127997
PCT Pub. Date: Nov. 11, 2010

(65) Prior Publication Data
US 2012/0101240 A1   Apr. 26, 2012

(30) Foreign Application Priority Data
May 4, 2009   (EP) .................................... 09159316

(51) Int. Cl.
| | | |
|---|---|---|
| *C08F 10/06* | (2006.01) | |
| *C08F 210/06* | (2006.01) | |
| *C08L 23/12* | (2006.01) | |
| *C08F 4/643* | (2006.01) | |

(52) U.S. Cl.
CPC ................ *C08F 4/643* (2013.01); *C08F 10/06* (2013.01); *C08F 210/06* (2013.01); *C08L 23/12* (2013.01); *Y10T 428/2982* (2015.01)

(58) Field of Classification Search
USPC ................ 502/103, 104, 118, 108, 128, 115; 526/124.1, 124.2, 124.3
See application file for complete search history.

(56) References Cited

U.S. PATENT DOCUMENTS

| | | | | |
|---|---|---|---|---|
| 5,693,583 | A  * | 12/1997 | Hagerty et al. | 502/115 |
| 7,005,400 | B2 * | 2/2006 | Takahashi | 502/152 |
| 7,256,150 | B2 * | 8/2007 | Denifl et al. | 502/127 |

FOREIGN PATENT DOCUMENTS

| | | |
|---|---|---|
| EP | 1270610 A1 | 1/2003 |
| EP | 1 803 743 A1 | 7/2007 |
| EP | 2 065 404 A1 | 6/2009 |
| JP | 2003246811 A | 9/2003 |
| JP | 20030246811 | 9/2003 |
| JP | 2004018763 | 1/2004 |
| JP | 200625331 A | 1/2006 |
| WO | 9722633 A1 | 6/1997 |
| WO | 0246250 A2 | 6/2002 |
| WO | WO-2009/068577 A1 | 6/2009 |

OTHER PUBLICATIONS

Li et al., "Ethylene polymerization over a nano-sized silica supported Cp2ZrCl2/MAO catalyst," Catal. Commun. 8 (2007) 1209-1213.*
Chinese Office Action for Corresponding Chinese Application No. 201080018503.1.
Japanese Office Action for Corresponding Japanese Application No. 2012-501322.
Japanese Office Action Mailed Aug. 6, 2013.
European Office Action dated May 7, 2015.

* cited by examiner

*Primary Examiner* — Ling Choi
*Assistant Examiner* — Catherine S Branch
(74) *Attorney, Agent, or Firm* — Tarolli, Sundheim, Covell & Tummino LLP

(57) ABSTRACT

A process for the preparation of a catalyst that is in the form of solid particles includes
preparing a solution of a complex of a metal and an electron donor;
adding to the solution solid material obtaining a suspension
combining the suspension at a temperature of at least 50° C. with at least one transition metal compound resulting in a precipitation of the catalyst being in the form of a solid particle; and
optionally separating the catalyst.

18 Claims, 2 Drawing Sheets

Figure 1: Particle size distribution.

PREPARATION OF PRECIPITATED ZN PP CATALYSTS WITH INTERNAL PORE STRUCTURE USING NANOPARTICLES

RELATED APPLICATION

This application corres. to PCT/EP2010/055885, filed Apr. 30, 2010, which claims priority from European Patent Application No. 09159316.0, filed May 4, 2009, the subject matter of which are incorporated herein by reference in their entirety.

The present invention relates to a new process for the preparation of a new catalyst as well as the use of said new catalyst in polymerization processes.

In the field of catalysts great efforts are undertaken to further improve the catalyst types tailored for specific purposes. For instance in polymerization processes Ziegler-Natta catalysts are widely used having many advantages. Usually such Ziegler-Natta catalysts are typically supported on carrier materials, such as porous organic and inorganic support materials, such as silica, $MgCl_2$ or porous polymeric materials. However such types of catalysts supported on external porous support or carrier material have quite often drawbacks, especially, if propylene copolymers with high comonomer content are to be produced. High comonomer content is possible to incorporate into the polymer, if the external support material is porous enough, so that the volume of the monomers to be copolymerized does not exceed the pore volume, and thus stickiness could be avoided. On the other hand, if the porosity is low, then undesired stickiness problems in the reactor vessels as well as in the transfer lines will appear, if higher comonomer content is desired. However, serious drawbacks in using support material with high porosity in order to get high comonomer content are that the structure of the catalyst particles, and further polymer particles becomes very weak, and further the bulk density of the polymer will be very low. The morphology of the catalyst particles is highly dependent on the morphology of the carrier or support material, and further, due to the replica effect, the morphology of polymer particles is dependent of the catalyst particles. Weak catalyst and polymer particle structure will lead easily to break up of particles and thus formation of hot catalyst particles as well as fines. This will result in fouling and formation of sticky material, as is well known in the art. In addition low bulk density is detrimental in view of high output rates, i.e. the polymerization process becomes very uneconomical to run. In WO 2005/113613 it is suggested to use a catalyst as described in WO 03/000757 in the manufacture of heterophasic propylene copolymers. The employed catalyst enables to increase the output rate since the bulk density of the polymerized product can be increased. The catalyst is in particular featured by a rather low surface area. However such types of catalysts are unsuitable in processes in which high amounts of comonomers shall be incorporated into the polymer. In particular the above mentioned stickiness cannot be satisfactorily reduced.

WO 2007/077027 provides also catalyst particles with rather low surface area however additionally featured by inclusions, i.e. areas within the particles without any catalytic activity. Such types of catalyst are an advancement compared to the catalysts known in the art and as described in WO 03/000757. For instance such types of catalysts enable to produce propylene polymers with a certain amount of comonomers. However neither this important fact has been recognized nor has been recognized that a further improvement of such type of catalysts might bring the breakthrough in the manufacture of propylene copolymers with high comonomer content.

Figure 1:
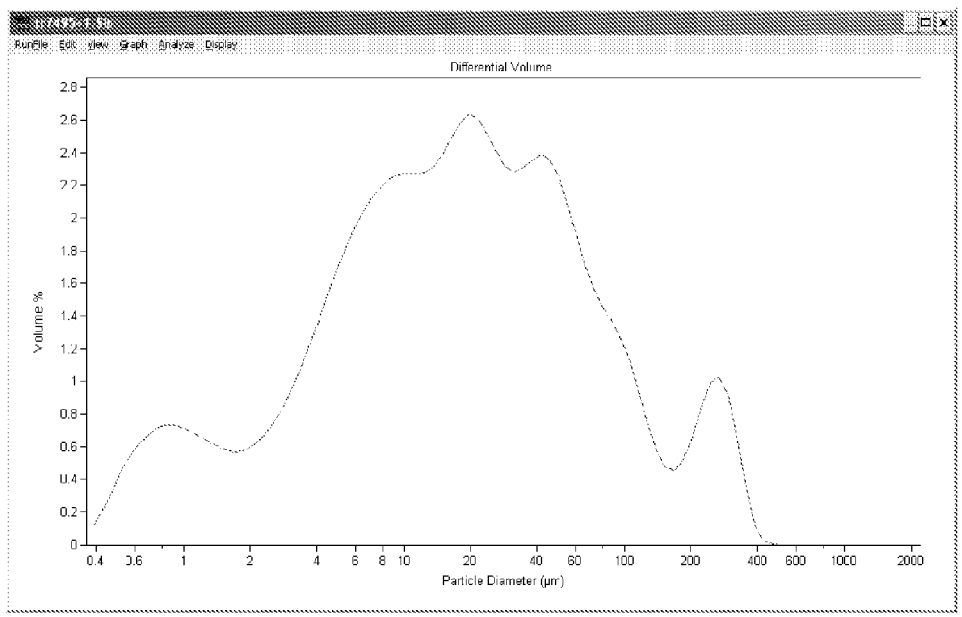
FIG. 1 illustrates particle size distribution.

Accordingly the object of the present invention is to provide a process for the preparation of a catalyst which enables to produce propylene copolymers, in particular heterophasic propylene copolymers or random propylene copolymers, with high comonomer content, i.e. even higher than 35 wt.-%, overcoming the known stickiness problems in the reactor vessels as well as in the transfer lines, and still having a high bulk density. I.e. according to the invention it is possible to achieve a desired balance between high comonomer content and high bulk density. Thus it is a further object of the present invention that the process leads to a catalyst which reduces the risk of reactor fouling. Moreover a high throughput should be assured due to the high bulk density. Additionally the process shall assure that the obtained catalyst has a high polymerization activity.

The finding of the present invention is to produce a catalyst as a solid particle with low surface area, is compact in nature, i.e. has low porosity, and is of reasonable to small particle size but of broad particle size distribution, and wherein said particle comprises solid material with a surface area below 500 $m^2/g$.

Accordingly the present invention is directed to a process for the preparation of a catalyst in form of a solid particle. In principle said catalyst can be obtained in two different ways. In the first way the preparation of the catalyst in form of (a) solid particle(s) comprises the steps of (a1) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);

(b1) adding to said solution solid material (SM) obtaining a suspension (S1), said solid material (SM)
(i) does not comprise catalytically active sites,
(ii) optionally is inert towards the catalyst components,
(iii) has a specific surface area below 500 $m^2/g$, and
(iv) has a mean particle size below 100 nm;

(c1) combining said suspension (S1) at a temperature of at least 50° C., preferably in the temperature range of 50 to 110° C., like 70 to 100° C., most preferably in the range of 85 to 95° C., with at least one transition metal compound (CT), preferably with at least one transition metal compound (CT) being in a liquid form at said temperature, resulting in a precipitation of said catalyst being in the form of a solid particle, wherein said transition metal compound (CT) is selected from one of the groups 4 to 10 of the periodic table (IUPAC) or a compound of actinide or lanthanide; and (d1) optionally separating said catalyst;

said catalyst being in the form of (a) solid particle(s), which
(i) has (have) a specific surface area of less than 20 $m^2/g$,
(ii) contain(s) said solid material (SM), and
(iii) optionally has (have) a particle size distribution of a SPAN value of at least 2.0, more preferably of at least 3.0, yet more preferably of at least 4.0.

It is especially appreciated that after having combined the suspension (S1) with at least one transition metal compound (CT) the whole reaction mixture is kept at least at 50° C., more preferably is kept in the temperature range of 50 to 110° C., like 70 to 100° C., most preferably in the range of 85 to 95° C., to secure full precipitation of the catalyst in form of a solid particle.

The transition metal compound (CT) in step (c1) is possible to dissolve in an organic liquid reaction medium (OL2), whereby solution B is formed. In addition it is possible, but not necessary to add some precipitating agent into the system. Such precipitating agents are able to effect morphology of the particles formed during the precipitation step. In a specific process no precipitating agent has been used. A precipitating agent according to this invention is an agent which promotes the precipitation of the catalyst in form of a solid particle. The organic liquid medium used as (OL2), as defined later in this application, can promote the precipitating and thus act and used as a precipitating agent. However, the final catalyst does not contain any such medium. In addition, it is possible to use as separate precipitating agent so called seed material, like silica or $MgCl_2$ particles, however not to be confused with the solid material (SM) used in the present invention. However, the particle size of the seed materials might be undesirable big to some applications, thus the use of such materials has to be considered separately for different applications.

Further, a "suspension" throughout the present invention is understood as a homogeneous fluid containing solid particles. The particles may have sizes that are sufficiently large for sedimentation. However the suspension caused due to the solid material (SM) having a very low mean particle size (as non soluble material) may not lead to sedimentation. Thus the term "suspension" covers also colloids, i.e. homogeneous fluids containing solid particles, which will not settle over time if left undisturbed. Unlike to a suspension in a solution the dissolved substance does not exist as a solid. Accordingly a "solution" according to the present invention is a homogenous mixture composed of two or more substances. In such a mixture, a solute is dissolved in another substance, known as a solvent.

The solid material (SM) of the present invention shall not have any catalytically active sites, which means nothing other than the solid material (SM) does not comprise, i.e. does not consist of, components and compounds, like transition metal compounds of group 4 to 10 of the periodic table (IUPAC), which has catalytic activity in polymerization processes. Thus in a preferred embodiment the solid material (SM) is catalytically inert in polymerization processes, in particular in polymerization processes for the preparation of polyolefin, like polypropylene or polyethylene.

The term "inert" is understood as defined by IUPAC (IUPAC Compendium of Chemical Terminology 2nd Edition (1997)). Accordingly inert is something in case it is unreactive under specified conditions. The "specific conditions" in the present applications are the conditions under which the catalyst is prepared and conditions under which the polymerization of monomers as defined is carried out. Accordingly the solid material (SM) is inert preferably in a temperature range of −50 to 200° C., more preferably of −20 to 150° C., at a pressure from 1 to 100 bar, more preferably from 45 to 100 bar, yet more preferably from 50 to 90 bar, still yet more preferably from 55 to 70 bar.

Accordingly the term "unreactive" or "inert" indicates that the solid material (SM) fails to react with the components present during the polymerization process of the monomers, preferably during the preparation of polyolefin, like polypropylene or polyethylene. Further the solid material (SM) shall be not only inert toward the monomers or polymers, but also inert, i.e. unreactive, toward the other components of the catalyst. Thus the solid material (SM) fails to react with the components used for the preparation of the catalyst in the form of a solid particle. The solid material (SM) also fails to react with the final components of the catalyst in the form of a solid particle. Accordingly the solid material should not contain any organic or inorganic reactive residues or functional groups. Typical examples of such groups are e.g. —OH, —OR, —COOH, —COOR, —CONH$_2$ groups or the like.

In a second way the preparation of the catalyst in form of (a) solid particle(s) comprises the steps of (a2) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);

(b2) adding solid material (SM) to at least one transition metal compound (CT), preferably to at least one transition metal compound (CT) being in a liquid form at a temperature of at least 50° C., like in a temperature range of 85 to 95° C., said transition metal compound (CT) is selected from one of the groups 4 to 10 of the periodic table (IUPAC) or a compound of actinide or lanthanide, obtaining a suspension (S2), said solid material (SM)

(i) does not comprise catalytically active sites,
(ii) optionally is inert towards the catalyst components,
(iii) has a specific surface area below 500 m$^2$/g, and
(iv) has a mean particle size below 100 nm;

(c2) combining said solution (A) with said suspension (S2) at a temperature of at least 50° C., preferably in the temperature range of 50 to 110° C., like 70 to 100° C., most preferably in the range of 85 to 95° C. resulting in a precipitation of said catalyst being in the form of solid particles; and (d2) optionally separating said catalyst;

said catalyst being in the form of (a) solid particle(s), which (i) has (have) a specific surface area of less than 20 m$^2$/g,
(ii) contain(s) said solid material (SM), and
(iii) optionally has (have) a particle size distribution of a SPAN value of at least 2.0, more preferably of at least 3.0, yet more preferably of at least 4.0.

Alternatively the chronology of the steps (a2) and (b2) can be changed or can be done at the same time.

The transition metal compound (CT) in step (b2) is possible to dissolve in an organic liquid reaction medium (OL2), whereby solution B is formed. In addition it is possible, but not necessary to add some precipitating agent into the system. In a specific process no precipitating agent has been used.

In the following the obtained catalyst will be defined in more detail. Subsequently detailed information to the process steps is provided.

Accordingly the process of the present invention leads to a catalyst in form of (a) solid particle(s), wherein the solid particle(s)

(a) has (have) a specific surface area of less than 20 m$^2$/g,
(b) comprise(s) a transition metal compound which is selected from one of the groups 4 to 10 of the periodic table (IUPAC) or a compound of actinide or lanthanide, preferably of the groups 4 to 6 of the periodic table (IUPAC),
(c) comprise(s) a metal compound which is selected from one of the groups 1 to 3 of the periodic table (IUPAC), preferably comprises a Group 2 metal compound (IUPAC), like a Mg compound,
(d) comprise(s) solid material (SM), wherein said solid material (SM)
(i) does not comprise catalytically active sites,
(ii) optionally is inert towards the catalyst components
(iii) has a specific surface area below 500 m$^2$/g, and
(iv) has a mean particle size below 100 nm,
(e) has (have) a particle size in the range of 5 to 200 μm, and (f) optionally has (have) a particle size distribution of a SPAN value of at least 2.0, more preferably of at least 3.0, yet more preferably of at least 4.0.

Alternatively the catalyst obtained according to the process can be described as a catalyst being in the form of (a) solid particle(s), wherein said solid particle(s)

(a) has (have) a surface area measured of less than 20 $m^2/g$, (b) optionally has (have) a particle size distribution of a SPAN value of at least 2.0, more preferably of at least 3.0, yet more preferably of at least 4.0

(c) comprise(s)

(i) a transition metal compound which is selected from one of the groups 4 to 10 of the periodic table (IUPAC) or a compound of actinide or lanthanide, preferably of the groups 4 to 6 of the periodic table (IUPAC), and (ii) a metal compound which is selected from one of the groups 1 to 3 of the periodic table (IUPAC), preferably a Group 2 metal compound (IUPAC), like a Mg compound, wherein (at least) the transition metal compound (or the compound of actinide or lanthanide) (i) with the metal compound (II) constitutes the active sites of said particle, and (d) comprise(s) a solid material (SM), wherein said solid material (SM)

(i) does not comprise catalytically active sites, (ii) has a specific surface area below 500 $m^2/g$, and (iii) optionally is inert towards the catalyst components (iv) has a mean particle size below 100 nm.

It can be also said, that the catalyst being in a form of (a) solid particle(s) obtained by the inventive process comprises a solid material (SM) being free from transition metal compounds which are selected from one of the groups 4 to 10 of the periodic table (IUPAC) and free from compounds of actinide or lanthanide.

In a preferred embodiment the solid material (SM) is also inert towards the catalyst components and components used during the catalyst preparation.

With the inventive process can be in particular a catalyst produced which has been not described earlier. Such catalyst is a precipitated solid particle with solid material (SM) as described above embedded therein. In a specific embodiment such a catalyst is free of any (detectable) precipitating agent residues.

Accordingly the present invention is also directed to a catalyst, which is preferably obtainable by a process as defined in the instant invention, wherein the catalyst is in form of (a) solid particle(s), said particle(s)

(a) has (have) a specific surface area of less than 20 $m^2/g$, (b) is (are) free of any precipitating agent residues, (c) optionally has (have) a particle size distribution of a SPAN value of at least 2.0, more preferably of at least 3.0, yet more preferably of at least 4.0, (d) comprise(s) a transition metal compound which is selected from one of the groups 4 to 10 of the periodic table (IUPAC) or a compound of actinide or lanthanide, preferably from one of the groups 4 to 6 of the periodic table (IUPAC), (e) comprise(s) a metal compound which is selected from one of the groups 1 to 3 of the periodic table (IUPAC), preferably a Group 2 metal compound (IUPAC), like a Mg compound, and (f) comprise(s) solid material (SM), wherein said solid material (SM)

(i) optionally does not comprise catalytically active sites, (ii) optionally is inert towards the catalyst components, (iii) has a specific surface area below 500 $m^2/g$, and (iv) has a mean particle size below 100 nm.

As stated above the inventive process enables to produce a catalyst being free of any precipitating agent residues. "Free" in this context throughout the invention means that not more than 1.0 wt.-%, preferably not more than 0.5 wt.-%, more preferably not more than 0.05 wt.-%, still more preferably not more than 0.005 wt.-%, yet more preferably no detectable precipitating agent is present within the solid catalyst.

Preferably, the catalyst as defined in the previous two paragraphs is a precipitated solid particle. "Precipitation" according to this invention means that during the catalyst preparation a chemical reaction in a solution takes place leading to the desired catalyst insoluble in said solution. Such a precipitated solid catalyst particle is different in form and shape to a catalyst being also in the form of a solid particle but obtained by a process wherein first the catalyst has been produced in a solution, without any precipitation, i.e. the obtained catalyst remains in soluble state. The solidification of such catalyst is achieved by a subsequent step, said step includes the change of the solution condition (for instance temperature change, like heating).

Thus the new catalyst, which is preferably obtainable by a process as defined in the instant invention, can be alternatively defined as catalyst being in form of (a) precipitated solid particle(s), wherein said particle(s)

(a) has (have) a specific surface area of less than 20 $m^2/g$, (b) optionally is (are) free of any precipitating agent residue, (c) optionally has (have) a particle size distribution of a SPAN value of at least 2.0, more preferably of at least 3.0, yet more preferably of at least 4.0, (d) comprise(s) a transition metal compound which is selected from one of the groups 4 to 10 of the periodic table (IUPAC) or a compound of actinide or lanthanide, (e) comprise(s) a metal compound which is selected from one of the groups 1 to 3 of the periodic table (IUPAC), preferably a Group 2 metal compound (IUPAC), like a Mg compound, (f) comprise(s) solid material (SM), wherein the solid material (SM)

(i) optionally does not comprise catalytically active sites, (ii) optionally is inert towards the catalyst components, (iii) has a specific surface area below 500 $m^2/g$, and (iv) has a mean particle size below 100 nm.

Preferably the solid material (SM) does not comprise any catalytically active sites and is inert towards the catalyst components.

Surprisingly it has been found out that with the above defined catalyst propylene copolymers with high comonomer content are obtainable without causing any stickiness problems during the manufacture. Also the throughput of the produced material is high due to the increased bulk density of the produced polymers. With the new catalyst heterophasic propylene copolymers are producible with xylene solubles of at least 30 wt.-%, preferably of at least 35 wt.-%, i.e. from at least 30 to 60 wt.-%, like 35 to 45 wt.-%, and nevertheless showing excellent flowability properties. The catalyst particle is in particular featured by very low surface area which indicates that the surface of the catalyst particle is essentially free of pores penetrating from the interior of the particles up to the surface of the particle. On the other hand, the catalyst particle comprises solid material (SM) which however causes areas within the particle without any catalytic activity. Because of the "replication effect", with the new catalyst inter alia a heterophasic propylene copolymer is producible, wherein said copolymer is featured by a polymer matrix having an internal pore structure, which however does not extend to the matrix surface. In other words the matrix of such a heterophasic propylene copolymer has internal pores or cavities which have no connection to the surface of the matrix. These internal pores or cavities are able to accumulate the elastomeric propylene copolymer produced in a polymerization stage, where heterophasic polymer is produced. In a multistage polymerization process this is usually the second stage. Thus the elastomeric material (which is also called rubber material) mainly concentrates in the interior of the matrix. The elastomeric material however is the main causer of the stickiness problems in such type of processes, where normal supported catalysts are used, which problem can now be avoided, even if high amounts of elastomeric material is used. In a special and preferred embodiment the solid material (SM) is evenly distributed within in the solid particle and due to the replication effect it is also possible to distribute within the propylene polymer matrix the elastomeric propylene copolymer very evenly. This allows avoiding the formation of a concentration gradient within the polymer particle. Thus the new catalyst is the ideal candidate for processes for producing heterophasic propylene copolymers. But not only for the manufacture of heterophasic systems the outstanding character of the new catalyst comes obvious also when this new catalyst is employed in processes for the manufacture of random propylene copolymers with high comonomer content. The new catalyst enables to produce random propylene copolymers with reasonable high amounts of comonomer and having good randomness. Moreover also during the process no stickiness problems occur, even with high comonomer content.

Naturally the catalyst of the present invention can be used for producing random and heterophasic polypropylene with lower amounts of comonomer, or for producing homopolymers, too.

As stated above one requirement is that the catalyst is in the form of a solid particle. The particle shape due to the applied process differ in their form compared to the catalyst particle described for instance in WO 03/000754, WO 03/000757 or WO04/029112. In said documents the catalyst particles are described as having typically clearly spherical shape, whereas the catalyst particles of the present invention are not necessary clearly of spherical shape.

Further the catalyst particle is essentially free of pores or cavities having access to the surface. In other words the catalyst particle has areas within the particle being not catalytic active but the catalyst particle is essentially free of pores or cavities, being open to the surface. The low surface area of the catalyst particle shows the absence of open pores.

Conventional Ziegler-Natta catalysts are supported on external support material. Such material has a high porosity and high surface area meaning that its pores or cavities are open to its surface. Such kind of supported catalyst may have a high activity, however a drawback of such type of catalysts is that it tends to produce sticky material in particular when high amounts of comonomer is used in the polymerization process.

On the other hand catalysts as described for instance in WO 03/000754, WO 03/000757 or WO 04/029112 having a compact structure without any internal areas without any catalytic activity, spherical shape, narrow particle size distribution, and low surface area, tend to cause stickiness problems, if polypropylene with higher amounts of elastomeric material, like ethylene, is prepared.

Therefore it is appreciated that the catalyst as defined herein avoids the drawbacks of prior art catalysts but still has a rather low to very low surface area, but is still being able to produce heterophasic polypropylene even with high amount of ethylene without stickiness problems. A low surface area is insofar appreciated as therewith the bulk density of the produced polymer can be increased enabling a high throughput of material. Moreover a low surface area also reduces the risk that the solid catalyst particle has pores extending from the interior of the particle to the surface. Typically the catalyst particle has a surface area measured according to the commonly known BET method with $N_2$ gas as analysis adsorptive of less than 20 $m^2/g$, more preferably of less than 15 $m^2/g$, yet more preferably of less than 10 $m^2/g$. In some embodiments, the solid catalyst particle in accordance with the present invention shows a surface area of 5 $m^2/g$ or less, which is the lowest detection limit with the methods used in the present invention.

The catalyst particle can be additionally defined by the pore volume. Thus it is appreciated that the catalyst particle has a porosity of less than 1.0 ml/g, more preferably of less than 0.5 ml/g, still more preferably of less than 0.3 ml/g and even less than 0.2 ml/g. In another preferred embodiment the porosity is not detectable when determined with the method applied as defined in the example section.

As stated above the solid catalyst particle obtained by the process of the present invention has a rather broad particle size distribution compared to the catalyst particles prepared according to the principles described in e.g. WO 03/000754, WO 03/000757 or WO 04/029112. Actually the solid catalyst particles obtained by the processes disclosed in said publications have a particle size distribution of a SPAN value of clearly below 1.5. On the other hand the catalyst in the form of a solid particle according to the present invention has preferably a particle size distribution of a SPAN value of at least 2.0, more preferably of at least 3.0, yet more preferably of at least 4.0. The exact definition of the SPAN value is given in the example section.

Moreover the solid catalyst particle in accordance with the present invention typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 80 μm, more preferred 10 to 60 μm.

The inventive catalyst particle comprises of course one or more catalytic active components. These catalytic active components constitute the catalytically active sites of the catalyst particle. As explained in detail below the catalytic active components, i.e. the catalytically active sites, are distributed within the part of the catalyst particles not being the solid material (SM). Preferably they are distributed evenly.

Active components according to this invention are, in addition to the transition metal compound which is selected from one of the groups 4 to 10 of the periodic table (IUPAC) or a compound of actinide or lanthanide and the metal compound which is selected from one of the groups 1 to 3 of the periodic table (IUPAC) (see above and below), also aluminum compounds, additional transition metal compounds, and/or any reaction product(s) of a transition compound(s) with group 1 to 3 metal compounds and aluminum compounds. Thus the catalyst may be formed in situ from the catalyst components by a precipitation process.

It should also be understood that the catalyst particle prepared according to the invention may be used in a polymerization process together with cocatalysts to form an active catalyst system, which further may comprise e.g. external donors etc. Furthermore, said catalyst of the invention may be part of a further catalyst system. These alternatives are within the knowledge of a skilled person.

Thus preferably the (precipitated) catalyst particles have a surface area of less than 20 m²/g, optionally have a particle size distribution of a SPAN value of at least 2.0, more preferably of at least 3.0, yet more preferably of at least 4.0, being optionally free of any precipitating agent, and comprise, (a) a transition metal compound which is selected from one of the groups 4 to 10, preferably titanium, of the periodic table (IUPAC) or a compound of an actinide or lanthanide,
(b) a metal compound which is selected from one of the groups 1 to 3 of the periodic table (IUPAC), preferably a Group 2 metal compound (IUPAC), like a Mg compound,
(c) optionally an electron donor compound,
(d) optionally an aluminum compound, and
(e) solid material (SM), wherein the solid material (SM)
(i) optionally does not comprise catalytically active sites,
(ii) optionally is inert towards the catalyst components,
(iii) has a specific surface area below 430 m²/g, and
(iv) has a mean particle size below 100 nm.

Suitable transition metal compounds are in particular transition metal compounds of transition metals of groups 4 to 6, in particular of group 4, of the periodic table (IUPAC). Suitable examples include Ti, Fe, Co, Ni, Pt, and/or Pd, but also Cr, Zr, Ta, and Th, in particular preferred is Ti, like TiCl$_4$. Of the metal compounds of groups 1 to 3 of the periodic table (IUPAC) preferred are compounds of group 2 elements, in particular Mg compounds, such as Mg halides, Mg alkoxides etc. as known to the skilled person.

As the electron donor compound any donors known in the art can be used, however, the donor is preferably a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a C2-C16 alkanol and/or diol, and is preferable dioctyl phthalate or di-2-ethyl-hexyl phthalate.

The aluminum compound is preferably a compound having the formula (I)

$$AlR_{3-n}X_n \qquad (I)$$

wherein
R stands for a straight chain or branched alkyl or alkoxy group having 1 to 20, preferably 1 to 10 and more preferably 1 to 6 carbon atoms,
X stands for halogen, preferably chlorine, bromine or iodine, especially chlorine and
n stands for 0, 1, 2 or 3, preferably 0 or 1.

Preferably alkyl groups having from 1 to 6 carbon atoms and being straight chain alkyl groups, such as methyl, ethyl, propyl, butyl, pentyl or hexyl, preferably methyl, ethyl, propyl and/or butyl are used.

Illustrative examples of aluminum compounds to be employed in accordance with the present invention are diethyl aluminum ethoxide, ethyl aluminum diethoxide, diethyl aluminum methoxide, diethyl aluminum propoxide, diethyl aluminum butoxide, dichloro aluminum ethoxide, chloro aluminum diethoxide, dimethyl aluminum ethoxide.

Other suitable examples for the above defined aluminum compounds are tri-(C1-C6)-alkyl aluminum compounds, like triethyl aluminum, tri iso-butyl aluminum, or an alkyl aluminum compound bearing one to three halogen atoms, like chlorine. In particular preferred is triethylaluminum, diethylaluminum chloride and diethyl aluminum ethoxide.

As mentioned above catalyst systems may include in addition to the solid catalyst particles cocatalysts and/external donor(s) in a manner known in the art.

As the conventional cocatalyst, e.g. those based on compounds of group 13 of the periodic 10 table (IUPAC), e.g. organo aluminum, such as aluminum compounds, like aluminum alkyl, aluminum halide or aluminum alkyl halide compounds (e.g. triethylaluminum) compounds, can be mentioned. Additionally one or more external donors can be used which may be typically selected e.g. from silanes or any other well known external donors in the field. External donors are known in the art and are used as stereoregulating agent in propylene polymerization. The external donors are preferably selected from hydrocarbyloxy silane compounds and hydrocarbyloxy alkane compounds.

Typical hydrocarbyloxy silane compounds have the formula (II)

$$R'_O Si(OR'')_{4-O} \qquad (II)$$

wherein
R' is an a- or b-branched C3-C12-hydrocarbyl,
R" a C1-C12-hydrocarbyl, and
O is an integer 1-3.

More specific examples of the hydrocarbyloxy silane compounds which are useful as external electron donors in the invention are diphenyldimethoxy silane, dicyclopentyldimethoxy silane, dicyclopentyldiethoxy silane, cyclopentylmethyldimethoxy silane, cyclopentylmethyldiethoxy silane, dicyclohexyldimethoxy silane, dicyclohexyldiethoxy silane, cyclohexylmethyldimethoxy silane, cyclohexylmethyldiethoxy silane, methylphenyldimethoxy silane, diphenyldiethoxy silane, cyclopentyltrimethoxy silane, phenyltrimethoxy silane, cyclopentyltriethoxy silane, phenyltriethoxy silane. Most preferably, the alkoxy silane compound having the formula (II) is dicyclopentyl dimethoxy silane or cyclohexylmethyl dimethoxy silane.

It is also possible to include other catalyst component(s) than said catalyst components to the catalyst of the invention.

The scatalyst in the form of (a) solid particle(s) as defined in the instant invention is furthermore preferably characterized in that it comprises the catalytically active sites distributed throughout the solid catalyst particle, however not in those parts comprising solid material (SM) as defined above and in further detail below. In accordance with the present invention, this definition means that the catalytically active sites are distributed throughout the catalyst particle, preferably that the catalytically active sites make up a substantial portion of the solid catalyst particle in accordance with the present invention. In accordance with embodiments of the present invention, this definition means that the catalytically active components, i.e. the catalyst components, make up the major part of the catalyst particle.

A further requirement of the present invention is that the solid catalyst particle comprises solid material (SM) not comprising catalytically active sites. Alternatively or additionally the solid material (SM) can be defined as material being free of transition metals of groups 4 to 6, in particular of group 4, like Ti, of the periodic table (IUPAC) and being free of a compound of actinide or lanthanide. In other words the solid material (SM) does not comprise the catalytic active materials as defined under (c) of claim 8, i.e. do not comprise such compounds or elements, which are used to establish catalytically active sites. Thus in case the solid catalyst particle comprise any compounds of one of transition metals of groups 4 to 6, in particular of group 4, like Ti, of the periodic table (IUPAC) or a compound of actinide or lanthanide these are then not present in the solid material (SM). Further the solid material according to the present invention shall be not understood as possible impurities caused for instance during the preparation of said catalyst in the form of solid particles.

Such a solid material (SM) is preferably (evenly) dispersed within the catalyst particle. Accordingly the solid catalyst particles can be seen also as a matrix in which the solid material (SM) is dispersed, i.e. form a dispersed phase within the matrix phase of the catalyst particle. The matrix is then constituted by the catalytically active components as defined above, in particular by the transition metal compounds of groups 4 to 10 of the periodic table (IUPAC) (or a compound of actinide or lanthanide) and the metal compounds of groups 1 to 3 of the periodic table (IUPAC). Of course all the other catalytic compounds as defined in the instant invention can additionally constitute to the matrix of the catalyst particle in which the solid material (SM) is dispersed.

The solid material (SM) usually constitutes only a minor part of the total mass of the solid catalyst particle. Accordingly the solid particle comprises up to 30 wt.-% solid material (SM), more preferably up to 25 wt.-%. It is in particular preferred that the solid catalyst particle comprises the solid material (SM) in the range of 1 to 30 wt.-%, more preferably in the range of 2 to 25 wt.-% and yet more preferably in the range of 5 to 20 wt.-%.

The solid material (SM) may be of any desired shape, including spherical as well as elongated shapes and irregular shapes. The solid material (SM) in accordance with the present invention may have a plate-like shape or they may be long and narrow, for example in the shape of a fiber. Preferred solid material (SM) is either spherical or near spherical. Preferably the solid material (SM) has a spherical or at least near spherical shape. This kind of material is also easily commercially available.

Preferred solid material (SM) are inorganic materials as well as organic, in particular organic polymeric materials, suitable examples being nano-materials, such as silica, montmorillonite, carbon black, graphite, zeolites, alumina, as well as other inorganic particles, including glass nano-beads or any combination thereof. Suitable organic particles, in particular polymeric organic particles, are nano-beads made from polymers such as polystyrene, or other polymeric materials. In any case, the solid material (SM) employed of the solid catalyst particle has to be inert towards the catalyst components during the preparation of the solid catalyst particle as well as during the subsequent use in polymerization reactions. This means that the solid material (SM) is not to be interfered in the formation of active centres. One further preferred essential requirement of the solid material (SM) is that it does not comprise any compounds which are to be used as catalytically active compounds as defined in the instant invention.

Thus, for instance the solid material (SM) used in the present invention cannot be a magnesium-aluminum-hydroxy-carbonate. This material belongs to a group of minerals called layered double hydroxide minerals (LDHs), which according to a general definition are a broad class of inorganic lamellar compounds of basic character with high capacity for anion intercalation (Quim. Nova, Vol. 27, No. 4, 601-614, 2004). This kind of materials are not suitable to be used in the invention due to the reactivity of the OH—groups included in the material, i.e. OH groups can react with the $TiCl_4$ which is part of the active sites. This kind of reaction is the reason for a decrease in activity.

Accordingly it is particular preferred that the solid material (SM) is selected form spherical particles of nano-scale consisting of $SiO_2$, polymeric materials and/or $Al_2O_3$.

By nano-scale according to this invention is understood that the solid material (SM) has a mean particle size of below 200 nm, more preferred 100 nm or below. Accordingly it is preferred that the solid material (SM) has a mean particle size of 10 to 100 nm, more preferably from 20 to 90 nm, like 20 to 70 nm.

It should be noted that it is also an essential feature that the solid material (SM) has small mean particle size, i.e. below 200 nm, preferably below 100 nm, as indicated above. Thus, many materials having bigger particle size, e.g. from several hundreds of nm to μm scale, even if chemically suitable to be used in the present invention, are not the material to be used in the present invention. Such bigger particle size materials are used in catalyst preparation e.g. as traditional external support material as is known in the art. One drawback in using such kind of material in catalyst preparation, especially in final product point of view, is that this type of material leads easily to inhomogeneous material and formation of gels, which might be very detrimental in some end application areas, like in film and fibre production.

The solid material (SM) of the catalyst particle as defined in the instant invention have a surface area preferably below 500 $m^2$/g, more preferably below 450 $m^2$/g. Some useful nanomaterials can have a surface area even below 100 $m^2$/g.

By using solid material (SM) with lower surface area (preferably plus low mean particle size as stated above) the amount of solid material (SM) within the solid catalyst particle can be decreased but nevertheless an heterophasic propylene copolymer with high amounts of rubber can be produced without getting any stickiness problems.

Considering the above especially preferred the solid material (SM) within the solid catalyst particle has
(a) a surface area measured below 450 $m^2$/g, and
(b) a mean particle size below 90 nm Such solid material (SM) is preferably present in the solid catalyst particle in amounts of 5 to 20 wt.-%.

Preferably the catalyst particle of the present invention is obtained by a specific process. According to this process the solid material (SM) is either added to the solution (A) containing the complex (C) of the metal which is selected from one of the groups 1 to 3 of the periodic table (IUPAC) or to the transition metal compound (CT) in liquid form or to the solution (B) containing the transition metal compound (CT) in organic liquid reaction medium (OL2). Transition metal compound (CT) is selected from one of the groups 4 to 10 of the periodic table (IUPAC). In any case the process of the present invention is a precipitation process, i.e. the solid catalyst particles obtained due to chemical reaction are insoluble in the reaction medium.

Accordingly in a first preparation process, the process comprises the steps of (a1) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);

(b1) adding to said solution solid material (SM) obtaining a suspension (S1), said solid material (SM)
(i) does not comprise catalytically active sites,
(ii) optionally is inert towards the catalyst components,
(iii) has a specific surface area below 500 $m^2$/g, and
(iv) has a mean particle size below 100 nm;

(c1) combining said suspension (S1) at a temperature of at least 50° C., preferably in the temperature range of 50 to 110° C., like 70 to 100° C., most preferably in the range of 85 to 95° C., with at least one transition metal compound (CT), preferably with at least one transition metal compound (CT) being in a liquid form at said temperature, resulting in a precipitation of said catalyst being in the form of a solid particle, wherein said transition metal compound (CT) is selected from one of the groups 4 to 10 of the periodic table (IUPAC) or a compound of actinide or lanthanide; and (d1) optionally separating said catalyst;

said catalyst being in the form of (a) solid particle(s), which
(i) has (have) a specific surface area of less than 20 m$^2$/g,
(ii) contain(s) said solid material (SM), and
(iii) optionally has (have) a particle size distribution of a SPAN value of at least 2.0, more preferably of at least 3.0, yet more preferably of at least 4.0.

Alternatively the transition metal compound (CT) is dissolved in an organic liquid reaction medium (OL2), and used as solution B.

Alternatively the process comprises the steps of (a2) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);

(b2) adding solid material (SM) to at least one transition metal compound (CT), preferably to at least one transition metal compound (CT) being in a liquid form at a temperature of at least 50° C., like in a temperature range of 85 to 95° C., said transition metal compound (CT) is selected from one of the groups 4 to 10 of the periodic table (IUPAC) or a compound of actinide or lanthanide, obtaining a suspension (S2), said solid material (SM)
(iv) does not comprise catalytically active sites,
(v) optionally is inert towards the catalyst components,
(iii) has a specific surface area below 500 m$^2$/g, and
(iv) has a mean particle size below 100 nm;

(c2) combining said solution (A) with said suspension (S2) at a temperature of at least 50° C., preferably in the temperature range of 50 to 110° C., like 70 to 100° C., most preferably in the range of 85 to 95° C. resulting in a precipitation of said catalyst being in the form of solid particles; and (d2) optionally separating said catalyst;

said catalyst being in the form of (a) solid particle(s), which
(i) has (have) a specific surface area of less than 20 m$^2$/g,
(ii) contain(s) said solid material (SM), and
(iii) optionally has (have) a particle size distribution of a SPAN value of at least 2.0, more preferably of at least 3.0, yet more preferably of at least 4.0.

Alternatively the chronology of the steps (a2) and (b2) can be changed or can be done at the same time.

The transition metal compound (CT) in step (b2) is possible to dissolve in an organic liquid reaction medium (OL2).

Accordingly different to processes where the catalyst is first produced in a solution and kept in solution before separation, in the present case the produced solid catalyst particles are insoluble in the reaction medium and precipitate automatically. Moreover it is preferred that no precipitating agent has been used in the processes as stated above.

As stated above in a first step ((a1) or (a2)) a solution (A) of complex (C) of a metal which is selected from one of the groups 1 to 3 of the periodic table (IUPAC) and an electron donor (E) is prepared by reacting a compound (CM) of said metal with said electron donor (E) or a precursor (EP) thereof in an organic liquid reaction medium (OH). The metal compound (CM) used for the preparation of the complex (C) may be any metal compound (CM) which is selected from one of the groups 1 to 3 of the periodic table (IUPAC). However it is preferred that the complex (C) is a Group 2 metal complex, even more preferred a magnesium complex. Accordingly it is appreciated that the metal compound (CM) used in the preparation of said complex (C) is a Group 2 metal compound, like a magnesium compound.

Thus in step (a1) or (a2) preferably first a metal compound (CM) which is selected from one of the groups 1 to 3 of the periodic table (IUPAC), preferably from a Group 2 metal compound, like from a magnesium compound, containing preferably an alkoxy moiety is produced. More preferably the metal compound (CM) to be produced is selected from the group consisting of a Group 2 metal dialkoxide, like magnesium dialkoxide, a complex containing a Group 2 metal dihalide, like magnesium dihalide, and an alcohol, and a complex containing a Group 2 metal dihalide, like magnesium dihalide, and a Group 2 metal dialkoxide, like magnesium dialkoxide.

Thus the metal compound (CM) which is selected from one of the groups 1 to 3 of the periodic table (IUPAC), preferably from the Group 2 metal compound, like from the magnesium compound, is usually titaniumless.

Most preferably, the magnesium compound is provided by reacting an alkyl magnesium compound and/or a magnesium dihalide with an alcohol. Thereby, at least one magnesium compound precursor, selected from the group consisting of a dialkyl magnesium $R_2Mg$, an alkyl magnesium alkoxide RMgOR, wherein each R is an identical or a different $C_1$ to $C_{20}$ alkyl, and a magnesium dihalide $MgX_2$, wherein X is a halogen, is reacted with at least one alcohol, selected from the group consisting of monohydric alcohols R'OH and polyhydric alcohols R'(OH)$_m$, wherein R' is a $C_1$ to $C_{20}$ hydrocarbyl group and m is an integer selected from 2, 3, 4, 5 and 6, to give said magnesium compound (CM). R' is the same or different in the formulas R'OH and R'(OH)$_m$. The R of the dialkyl magnesium is preferably an identical or different $C_4$ to $C_{12}$ alkyl. Typical magnesium alkyls are ethylbutyl magnesium, dibutyl magnesium, dipropyl magnesium, propylbutyl magnesium, dipentyl magnesium, butylpentyl magnesium, butyloctyl magnesium and dioctyl magnesium. Typical alkylalkoxy magnesium compounds are ethyl magnesium butoxide, magnesium dibutoxide, butyl magnesium pentoxide, magnesium dipentoxide, octyl magnesium butoxide and octyl magnesium octoxide. Most preferably, one R is a butyl group and the other R of $R_2Mg$ is an octyl group, i.e. the dialkyl magnesium compound is butyl octyl magnesium.

The alcohol used to in the reaction with the magnesium compound precursor as stated in the previous paragraph is a monohydric alcohol, typically $C_1$ to $C_{20}$ monohydric alcohols, a polyhydric (by definition including dihydric and higher alcohols) alcohol or a mixture of at least one monohydric alcohol and at least one polyhydric alcohol. Magnesium enriched complexes can be obtained by replacing a part of the monohydric alcohol with the polyhydric alcohol. In one embodiment it is preferred to use one monohydric alcohol only.

Preferable monohydric alcohols are those of formula R'OH in which R' is a $C_2$ to $C_{16}$ alkyl group, most preferably a $C_4$ to $C_{12}$ alkyl group, like 2-ethyl-1-hexanol.

Typical polyhydric alcohols are ethylene glycol, propene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, glycerol, trimethylol propane and pentaerythritol. Most preferably the polyhydric alcohol is selected from the group consisting of ethylene glycol, 2-butyl-2-ethyl-1,3-propanediol and glycerol.

The reaction conditions used to obtain the metal compound (CM) which is selected from one of the groups 1 to 3 of the periodic table (IUPAC), preferably the metal compound (CM) of Group 2, even more preferred the magnesium compound, may vary according to the used reactants and agents. However according to one embodiment of the present invention, said magnesium compound precursor is reacted with said at least one alcohol at temperature of 30 to 80° C. for 10 to 90 min, preferably about 30 min.

After having obtained the metal compound (CM) which is selected from one of the groups 1 to 3 of the periodic table (IUPAC), preferably the metal compound of Group 2, even more preferred the magnesium compound, said compound (CM) is further reacted with a dicarboxylic acid dihalide. Preferably said metal compound reacts with a dicarboxylic acid dihalide having the formula (X)

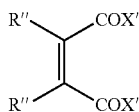

wherein
each R" is an identical or different $C_1$ to $C_{20}$ hydrocarbyl group or both R"s form together with the two unsaturated carbons seen in the formula (X) a $C_5$ to $C_{20}$ aliphatic or aromatic ring, and
X' is a halogen
to give the complex (C) of step (a1) or (a2).

Among non-cyclic dicarboxylic acid dihalides, the group consisting of maleic acid dihalide, fumaric acid dihalide and their R" substituted derivatives such as citraconic acid dihalide and mesaconic acid dihalide, respectively, are the most important.

Among the cyclic dicarboxylic acid dihalides, the group consisting of phthalic acid dihalide (1,2-benzene dicarboxylic acid dihalide), its hydrogenate 1,2-cyclohexane dicarboxylic acid dihalide, and their derivatives, is the most important. Most preferably, said dicarboxylic acid dihalide is phthaloyl dichloride.

Preferably the magnesium compound is reacted with the dicarboxylic acid halide in a molar ratio $Mg_{total\ added}$/dicarboxylic acid halide of 1:1 and 1:0.1, preferably between 1:0.6 and 1:0.25.

Preferably the metal compound (CM) which is selected from one of the groups 1 to 3 of the periodic table (IUPAC), more preferably the metal compound of Group 2, even more preferably the magnesium compound, is reacted with the dicarboxylic acid dihalide under at least one of the following conditions:
adding said dicarboxylic acid dihalide under room temperature and
heating the obtained reaction mixture to a temperature of 20 to 80° C., preferably of 50 to 70° C.
keeping the temperature for 10 to 90 min, preferably for 25 to 35 min The organic liquid reaction medium (OL1) used for the preparation of the complex (C) in step (a1) or (a2) can be any organic solvent as long as it is ensured that the complex (C) is dissolved at ambient temperatures, i.e. at temperatures up to 80° C. (20 to 80° C.). Accordingly it is appreciated that the organic liquid reaction medium (OL1) comprises, preferably consists of, $C_5$ to $C_{10}$ hydrocarbon, more preferably of a $C_6$ to $C_{10}$ aromatic hydrocarbon, like toluene.

Subsequently the obtained solution of complex (C) (solution A) is first mixed with the solid material (SM) to obtain a suspension (S1) and afterwards brought in contact with at least one compound (CT) of a transition metal (alternative route 1) or the obtained complex (C) is directly added to a suspension (S2) of at least one transition metal compound (CT) and the solid material (SM). In both cases, i.e. in the steps (c1) and (c2), the temperature must be relatively high, i.e. at least 50° C., preferably in the temperature range of 50 to 110° C., more preferably of 70 to 100° C., like 85 to 915° C., to ensure that the precipitation occurs after the complex (C) is brought in contact with the transition metal compound (CT). Thus contrary to the applied processes as for instance disclosed in WO 03/000754 and WO 03/000757, in which the catalyst is also obtained by a chemical reaction, but said catalyst remains in solution after completion of the chemical reaction, in the present process the conditions are set in a manner that ensure an immediate precipitation of the solid catalyst particles. Accordingly one important requirement of the present process is to keep the temperature in step (c1) and (c2) as set out in this paragraph.

When adding the solution (A) or the suspension (S1) to the at least one transition metal compound (CT) (steps (c1) and (d2)) mixing is appreciated. Suitable mixing techniques include the use of mechanical as well as the use of ultrasound for mixing, as known to the skilled person.

Further it is appreciated that the organic liquid reaction media (OL1) and (OL2) are selected in a way which supports the immediate precipitation of the solid catalyst particle. As stated above, the organic liquid reaction medium (OL1) comprises, preferably consists of, $C_5$ to $C_{10}$ hydrocarbon, more preferably of a $C_6$ to $C_{10}$ aromatic hydrocarbon, like toluene. The organic liquid reaction medium (OL2), where $TiCl_4$ can be solved, can be the same as the organic liquid reaction medium (OL1) or can be different thereto, the latter being preferred. Preferably the organic liquid reaction medium (OL2) is $C_5$ to $C_{10}$ hydrocarbon, more preferably of a $C_6$ to $C_{10}$ alkane, like heptanes, octane or nonane, or any mixtures thereof. It is in particular appreciated that the organic liquid reaction medium (OL1) is $C_6$ to $C_{10}$ aromatic hydrocarbon, like toluene, and the organic liquid reaction medium (OL2) is a $C_6$ to $C_{10}$ alkane, like heptanes.

After precipitation the solid catalyst particle is washed in a known manner Accordingly it is preferred that solid catalyst particle is washed with toluene, preferably with hot (e.g. 90° C.) toluene and subsequently with heptane, most preferably with hot (e.g. 90 C.) heptane. Further washings, e.g. with gold heptanes, or pentane are possible as well.

Suitable transition metal compounds (CT) are in particular transition metal compounds (CT) of transition metals of groups 4 to 6, in particular of group 4, of the periodic table (IUPAC). Suitable examples include Ti, Fe, Co, Ni, Pt, and/or Pd, but also Cr, Zr, Ta, and Th, in particular preferred is Ti, like $TiCl_4$.

One essential aspect of the present process is to incorporate solid material (SM) in the solid catalyst particles. The solid material (SM) can be added to solution (A) or to the solution (B) of at least one transition metal compound (CT) and optionally an organic liquid reaction medium (OL2) obtaining a suspension (S1) and (S2), respectively. However it is preferred that the solid material (SM) is added to the solution (A) after the complex (C) has been formed and the thus obtained suspension (S1) is added to at least one transition metal compound (CT) in liquid form.

Additional catalyst components, like compounds of group 13 metal, as described above, can be added at any step before the final recovery of the solid catalyst.

The invention is further directed to the use of the inventive catalyst in polymerization processes, in particular in processes in which heterophasic material, like heterophasic propylene copolymer, or random propylene copolymer is produced.

Further, the invention is related to a polymerization process for producing propylene polymers, especially propylene copolymers, and more specifically to heterophasic propylene copolymers where a catalyst of the present invention is used.

The process for producing heterophasic polymers comprises at least two stages, in the first stage the propylene polymer matrix in the presence of the catalyst system as defined in the instant invention is produced. In the second stage the elastomeric propylene copolymer is polymerized in the presence of the propylene polymer matrix. Preferably also in the second stage the catalyst system as defined in the instant invention is present.

The process for the manufacture for propylene random copolymer can be a single stage process using a bulk phase, slurry phase or gas phase reactor. However it is preferred that the propylene random copolymer is produced in a multistage process in which the catalyst system of the instant invention is employed.

Preferably the polymerization conditions for the slurry reactor may be as follows:
the temperature is within the range of 40 to 110° C., preferably between 60 and 90° C.,
the pressure is within the range of 20 to 80 bar, preferably between 30 to 60 bar,
hydrogen can be added for controlling the molar mass in a manner known per se.

The polymerization conditions in the gas phase reactor may be as follows:
the temperature is within the range of 50 and 130° C., preferably between 65 and 100° C., and still more preferably between 70 and 85° C.
the pressure is within the range of 5 to 50 bar, preferably between 15 to 35 bar,
hydrogen can be added for controlling the molar mass in a manner known per se.

The present invention is further described by way of examples.

EXAMPLES

1. Definitions/Measuring Methods

The following definitions of terms and determination methods apply for the above general description of the invention as well as to the below examples unless otherwise defined. $MFR_2$ (230° C.) is measured according to ISO 1133 (230° C., 2.16 kg load).

Randomness in the FTIR measurements, films of 250 mm thickness were compression molded at 225° C. and investigated on a Perkin-Elmer System 2000 FTIR instrument. The ethylene peak area (760-700 $cm^{-1}$) was used as a measure of total ethylene content. The absorption band for the structure -P-E-P- (one ethylene unit between propylene units), occurs at 733 $cm^{-1}$. This band characterizes the random ethylene content. For longer ethylene sequences (more than two units), an absorption band occurs at 720 $cm^{-1}$. Generally, a shoulder corresponding to longer ethylene runs is observed for the random copolymers. The calibration for total ethylene content based on the area and random ethylene (PEP) content based on peak height at 733 $cm^{-1}$ was made by 13C-NMR. (Thermochimica Acta, 66 (1990) 53-68).

Randomness=random ethylene (-P-E-P-) content/the total ethylene content×100%.

Melting Temperature Tm, Crystallization Temperature Tc, and the Degree of Crystallinity:
measured with Mettler TA820 differential scanning calorimetry (DSC) on 5-10 mg samples.

Both crystallization and melting curves were obtained during 10° C./min cooling and heating scans between 30° C. and 225° C. Melting and crystallization temperatures were taken as the peaks of endotherms and exotherms.

Ethylene content, in particular of the matrix, is measured with Fourier transform infrared spectroscopy (FTIR) calibrated with 13C-NMR. When measuring the ethylene content in polypropylene, a thin film of the sample (thickness about 250 mm) was prepared by hotpressing. The area of absorption peaks 720 and 733 $cm^{-1}$ was measured with Perkin Elmer FTIR 1600 spectrometer. The method was calibrated by ethylene content data measured by 13C-NMR.

Xylene Soluble Fraction (XS) and Amorphous Fraction (AM)
2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks. The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
$m_1$=weight of residue (g)
$v_0$=initial volume (ml)
$v_1$=volume of analyzed sample (ml)

The solution from the second 100 ml flask is treated with 200 ml of acetone under vigorous stirring. The precipitate is filtered and dried in a vacuum-oven at 90° C.

$$AM\% = (100 \times m_2 \times v_0)/(m_0 \times v_1)$$

$m_0$=initial polymer amount (g)
$m_2$=weight of precipitate (g)
$v_0$=initial volume (ml)
$v_1$=volume of analyzed sample (ml)

Figure 2:
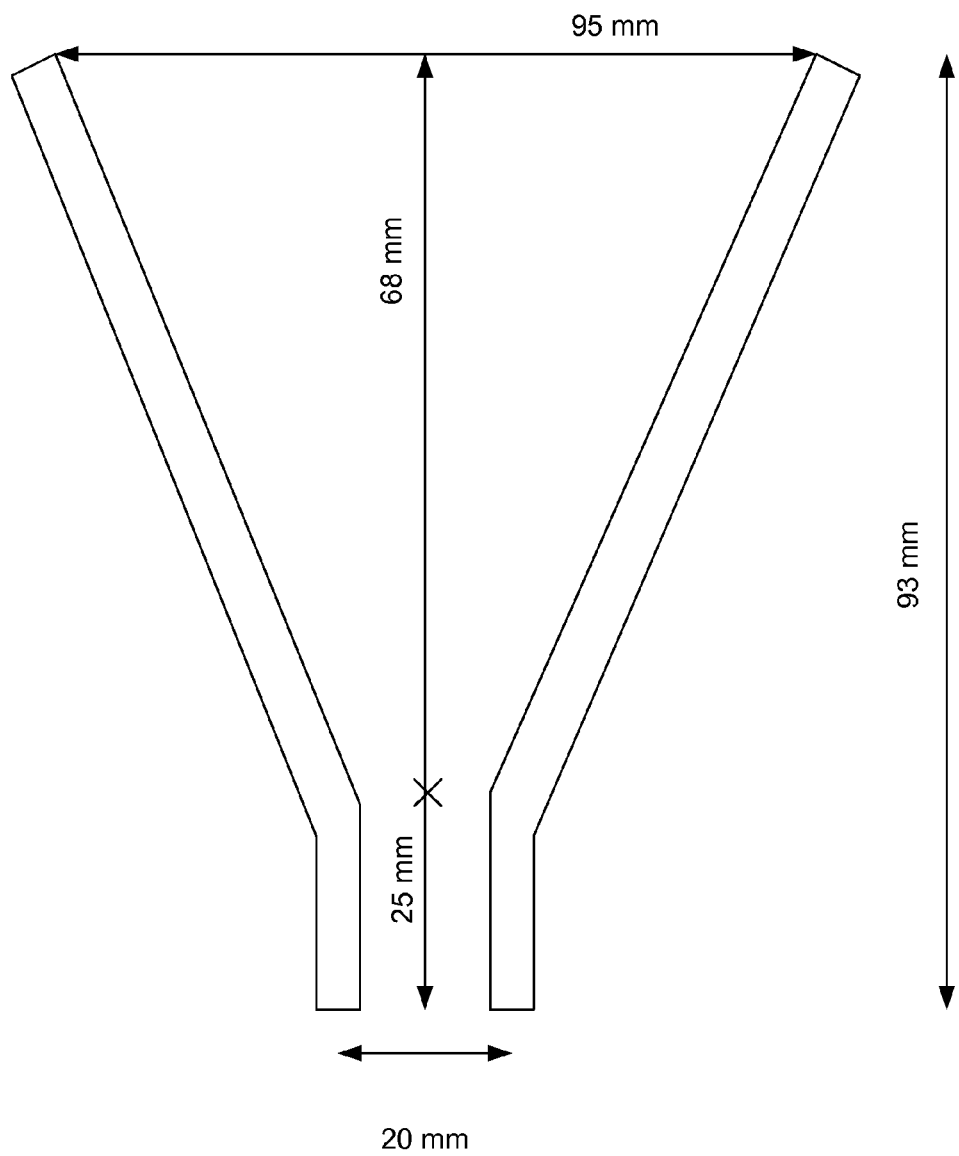
FIG. 2 illustrates a funnel for the flowability test.

Flowability 90 g of polymer powder and 10 ml of xylene was mixed in a closed glass bottle and shaken by hand for 30 minutes. After that the bottle was left to stand for an additional 1.5 hour while occasionally shaken by hand. Flowability was measured by letting this sample flow through a funnel at room temperature. The time it takes for the sample to flow through is a measurement of stickiness. The average of 5 separate determinations was defined as flowability. The dimensions of the funnel can be deducted from FIG. 2.

Porosity: BET with N2 gas, ASTM 4641, apparatus Micromeritics Tristar 3000; sample preparation (catalyst and polymer): at a temperature of 50° C., 6 hours in vacuum.

Surface area: BET with $N_2$ gas ASTM D 3663, apparatus Micromeritics Tristar 3000: sample preparation (catalyst and polymer): at a temperature of 50° C., 6 hours in vacuum.

Mean particle size is given in nm and measured with Coulter Counter LS200 at room temperature with n-heptane as medium; particle sizes below 100 nm by transmission electron microscopy.

Median particle size (d50) is given in nm and measured with Coulter Counter LS200 at room temperature with n-heptane as medium.

Particle size (d10) is given in nm and measured with Coulter Counter LS200 at room temperature with n-heptane as medium.

Particle size (d90) is given in nm and measured with Coulter Counter LS200 at room temperature with n-heptane as medium.

SPAN is defined as follows:

$$\frac{d90\ [\mu m] - d10\ [\mu m]}{d50\ [\mu m]}$$

Bulk density BD is measured according ASTM D 1895

Determination of Ti and Mg Amounts in the Catalyst

The determination of Ti and Mg amounts in the catalysts components is performed using ICP. 1000 mg/l standard solutions of Ti and Mg are used for diluted standards (diluted standards are prepared from Ti and Mg standard solutions, distilled water and $HNO_3$ to contain the same $HNO_3$ concentration as catalyst sample solutions).

50-100 mg of the catalyst component is weighed in a 20 ml vial (accuracy of weighing 0.1 mg). 5 ml of concentrated HNO3 (Suprapur quality) and a few milliliters of distilled water is added. The resulting solution is diluted with distilled water to the mark in a 100 ml measuring flask, rinsing the vial carefully. A liquid sample from the measuring flask is filtered using 0.45 μm filter to the sample feeder of the ICP equipment. The concentrations of Ti and Mg in the sample solutions are obtained from ICP as mg/l.

Percentages of the elements in the catalyst components are calculated using the following equation:

$$\text{Percentage}(\%) = (A \cdot V \cdot 100\% \cdot V \cdot 1000^{-1} \cdot m^{-1}) \cdot (V_a \cdot V_b^{-1})$$

where
A=concentration of the element (mg/l)
V=original sample volume (100 ml)
m=weight of the catalyst sample (mg)
$V_a$=volume of the diluted standard solution (ml)
$V_b$=volume of the 1000 mg/l standard solution used in diluted standard solution (ml)

Determination of Donor Amounts in the Catalyst Components

The determination of donor amounts in the catalyst components is performed using HPLC (UV-detector, RP-8 column, 250 mm×4 mm) Pure donor compounds are used to prepare standard solutions.

50-100 mg of the catalyst component is weighed in a 20 ml vial (accuracy of weighing 0.1 mg). 10 ml acetonitrile is added and the sample suspension is sonicated for 5-10 min in an ultrasound bath. The acetonitrile suspension is diluted appropriately and a liquid sample is filtered using 0.45 μm filter to the sample vial of HPLC instrument. Peak heights are obtained from HPLC.

The percentage of donor in the catalyst component is calculated using the following equation:

$$\text{Percentage}(\%) = A_1 \cdot c \cdot V \cdot A_2^{-1} \cdot m^{-1} \cdot 0.1\%$$

where
$A_1$=height of the sample peak
c=concentration of the standard solution (mg/l)
V=volume of the sample solution (ml)
$A_2$=height of the standard peak
m=weight of the sample (mg)

2. Preparation of the Examples

Example 1

Preparation of a Soluble Mg-complex

A magnesium complex solution was prepared by adding, with stirring, 55.8 kg of a 20% solution in toluene of BOMAG $(Mg(Bu)_{1.5}(Oct)_{0.5})$ to 19.4 kg 2-ethylhexanol in a 150 l steel reactor. During the addition the reactor contents were maintained below 20° C. The temperature of the reaction mixture was then raised to 60° C. and held at that level for 30 minutes with stirring, at which time reaction was complete. 5.50 kg 1,2-phthaloyl dichloride was then added and stirring of the reaction mixture at 60° C. was continued for another 30 minutes. After cooling to room temperature a yellow solution was obtained.

Example 2

Catalyst with Solid Material 19.5 ml titanium tetrachloride and 10 ml n-heptane were placed in a 300 ml glass reactor equipped with a mechanical stirrer. Mixing speed was adjusted to 170 rpm. The reactor was heated to 90° C. and a suspension of 0.4 g silica nanoparticles (Nanostructured & Amorphous Materials Inc., 80 nm, stock #4830HT) in 28.4 g of the Mg-complex was added to the stirred mixture over a period of 10 minutes. Stirring at 90° C. was then continued for another 30 minutes.

After settling and syphoning the solids underwent washing with 100 ml of toluene at 90° C. for 30 minutes, a mixture of 0.11 ml diethyl aluminum chloride and 100 ml toluene at 90° C. for 30 minutes, 60 ml heptane at 90° C. for 20 minutes, and 60 ml heptane at 20° C. for 10 minutes. Finally, the solids were dried at 60° C. by nitrogen purge, to yield a yellow, air-sensitive powder. Al content in the catalyst was 0.59 wt-%

Example 2A

Catalyst with Solid Material 0.4 g silica nanoparticles (Nanostructured & Amorphous Materials Inc., 80 nm, stock #4830HT), 19.5 ml titanium tetrachloride and 10 ml n-heptane were placed in a 300 ml glass reactor equipped with a mechanical stirrer. Mixing speed was adjusted to 170 rpm. The reactor was heated to 90° C. and 28.4 g of the Mg-complex was added to the stirred mixture over a period of 10 minutes. Stirring at 90° C. was then continued for another 30 minutes. After settling and syphoning the solids underwent washing with 100 ml of toluene at 90° C. for 30 minutes, a mixture of 0.11 ml diethyl aluminum chloride and 100 ml toluene at 90° C. for 30 minutes, 60 ml heptane at 90° C. for 20 minutes, and 60 ml pentane at 20° C. for 10 minutes. Finally, the solids were dried at 60° C. by nitrogen purge, to yield a yellowish, air-sensitive powder.

Example 3 (Comparative)

Catalyst without Solid Material

Catalyst with low surface area and compact structure was prepared as follows:

24. kg titanium tetrachloride were placed in a 90 l steel reactor and 21.0 kg of Mg-complex were then added to the stirred reaction mixture over a period of two hours. During the addition of the Mg-complex the reactor contents were maintained below 35° C.

4.5 kg n-heptane and 1.05 l Viscoplex®1-254 of RohMax Additives GmbH (a polyalkyl methacrylate with a viscosity at 100° C. of 90 $mm^2$/s and a density at 15° C. of 0.90 g/ml) were then added to the reaction mixture at room temperature and stirring was maintained at that temperature for a further 60 minutes.

The temperature of the reaction mixture was then slowly raised to 90° C. over a period of 60 minutes and held at that level for 30 minutes with stirring. After settling and siphoning the solids underwent washing with a mixture of 0.244 l of a 30% solution in toluene of diethyl aluminum dichlorid and 50 kg toluene for 110 minutes at 90° C., 30 kg toluene for 110 minutes at 90° C., 30 kg n-heptane for 60 minutes at 50° C., and 30 kg n-heptane for 60 minutes at 25° C.

Finally, 4.0 kg white oil (Primol 352; viscosity at 100° C. of 8.5 mm$^2$/s; density at 15° C. of 0.87 g/ml) was added to the reactor. The obtained oil slurry was stirred for a further 10 minutes at room temperature before the product was transferred to a storage container.

Example 4 (Comparative)

Catalyst with Nanoparticles, Different Preparation Method

This catalyst preparation method is described in patent application EP 07 122 047, filed 30.11.2008.

19.5 ml titanium tetrachloride was placed in a 300 ml glass reactor equipped with a mechanical stirrer. Mixing speed was adjusted to 170 rpm. 32.0 g of the Mg-complex were then added to the stirred reaction mixture over a 10 minute period. During the addition of the Mg-complex the reactor contents were maintained below 30° C.

1.0 ml of a solution in toluene of 3.0 mg polydecene and 2.0 ml ViscoplexR1-254 of RohMax Additives GmbH (a polyalkyl methacrylate with a viscosity at 100° C. of 90 mm2/s and a density at 15° C. of 0.90 g/ml) were then added, and after 5 minutes stirring at room temperature a suspension of 0.4 g SiO2 nanoparticles (mean particle size 80 nm; surface area 440 m2/g; bulk density 0.063 g/cm$^3$) in 10.0 ml of n-heptane was added. Stirring was maintained at room temperature for 30 minutes.

The temperature of the reaction mixture was then slowly raised to 90° C. over a period of 20 minutes and held at that level for 30 minutes with stirring.

After settling and syphoning the solids underwent washing with a mixture of 0.11 ml diethyl aluminum chloride and 100 ml toluene at 90° C. for 30 minutes, 60 ml heptane for 20 minutes 20 at 90° C. and 60 ml pentane for 10 minutes at 25° C. Finally, the solids were dried at 60° C. by nitrogen purge, to yield a yellow, air-sensitive powder.

TABLE 1

Properties of the catalyst particles

|  |  | Ex 2 | Ex 2A | Ex 3 comp | Ex 4 comp |
|---|---|---|---|---|---|
| Ti | [wt.-%] | 3.76 | 3.77 | 3.81 | 3.9 |
| Mg | [wt.-%] | 12.1 | 10.3 | 11.4 | 12.5 |
| Phthalate*P | [wt.-%] | 25.0 | 26.0 | 24.4 | 26.7 |
| Nanoparticles | [wt.-%] | 9.1 | 7.8 | — | 8.9 |
| Surface area** | [m$^2$/g] | <5.0 | <5.0 | <5.0 | <5.0 |
| Porosity | [ml/g] | BL*** | BL*** | BL | BL |
| Mean particle size | [μm] | 42.2 | 20 | 20.2 | 25.60 |
| D10 | [μm] | 1.97 | 2 | 5.2 | 16.2 |
| D50 | [μm] | 17.68 | 9 | 21.9 | 34.5 |
| D90 | [μm] | 104.80 | 45 | 28.4 | 55.4 |
| SPAN |  | 5.8 | 4.8 | 1.1 | 1.1 |

*The phthalate is bis(2-ethylhexyl)phthalate
**the lowest limit for measure surface area by the used method is 5 m$^2$/g
***BL means below the detection limit Random Polymerizations Example 5

All raw materials were essentially free from water and air and all material additions to the reactor and the different steps were done under inert conditions in nitrogen atmosphere. The water content in propylene was less than 5 ppm.

Stage 1: Bulk Polymerisation Step

The polymerisation was done in a 5 litre reactor, which was heated, vacuumed and purged with nitrogen before taken into use. 138 μl TEA (tri ethyl Aluminium, from Witco used as received), 47 μl donor D (dicyclo pentyl dimethoxy silane, from Wacker, dried with molecular sieves) and 30 ml pentane (dried with molecular sieves and purged with nitrogen) were mixed and allowed to react for 5 minutes. Half of the mixture was added to the reactor and the other half was mixed with 12.4 mg highly active and stereo specific Ziegler Natta catalyst of example 2 of the invention. After about 10 minutes was the ZN catalyst/TEA/donor D/pentane mixture added to the reactor. The Al/Ti molar ratio was 150 and the Al/Do molar ratio was 5. 350 mmol hydrogen and 1400 g were added to the reactor. Ethylene was added continuously during polymerisation and totally 19.2 g was added. The temperature was increased from room temperature to 70° C. during 16 minutes. The reaction was stopped, after 30 minutes at 70° C., by flashing out unreacted monomer. Finally the polymer powder was taken out from the reactor and analysed and tested. The polymer details are seen in table 2A.

Stage 2: Gas Phase Reactor

After having flashed out unreacted propylene after the bulk polymerisation step the polymerisation was continued in gas phase. After the bulk phase the reactor was pressurised up to 5 bar and purged three times with a 0.085 mol/mol ethylene/propylene mixture. 150 mmol hydrogen was added and temperature was increased to 80° C. and pressure with the aforementioned ethylene/propylene mixture up to 20 bar during 13 minutes. Consumption of ethylene and propylene was followed from scales. The reaction was allowed to continue until a total consumption (ethylene+propylene) of about 300 g was reached, which means half of the final product was produced in the bulk phase polymerisation and half in the gas phase polymerisation. When opening the reactor it was seen that the polymer powder was easily free flowing. XS of the polymer was 28 wt.-% and ethylene content in the product was 6.9 wt.-%, meaning that ethylene content in material produced in the gas phase was 10.0 wt.-%. Other details are seen in table 2A Example 6

Stage 1: Bulk Polymerisation Step

This first stage reaction was done as described above in example 5, with the exception that the catalyst of example 3 (comparative) was used. Ethylene content in the polymer was 3.7 wt.-%. The other details are shown in table 2B.

Stage 2: Gas Phase Reactor

The second stage was done as described above in example 5, of course again with the exception that the catalyst of example 3 (comparative) was used. When opening the reactor after polymerisation it was seen that about ⅔ of the polymer powder was loosely glued together. XS of the product was 23 wt.-%. Ethylene content in the final product was 6.3 wt.-%, which means that the ethylene content in the material produced in the gas phase was 8.9 wt.-%. The other details are shown in table 2B.

Example 7

Stage 1: Bulk Polymerisation Step

This first stage reaction was done as described above in example 5, with the exception that the catalyst of example 4

(comparative) was used. Ethylene content in the polymer was 3.7 wt.-%. The other details are shown in table 2B.

Stage 2: Gas Phase Reactor

The second stage was done as described above in example 5, of course again with the exception that the catalyst of example 4 (comparative) was used. When opening the reactor it was seen that the polymer powder was free flowing. XS of the polymer was 22 wt.-% and ethylene content in the product was 6.0 wt.-%, meaning that ethylene content in material produced in the gas phase was 8.3 wt.-%. Other details are seen in table 2B.

TABLE 2A

Polymerisation and Properties of the random polypropylene

|  |  | Ex 5 1. stage | Ex 5 2. stage |
|---|---|---|---|
| catalyst |  | Ex 2 | Ex 2 |
| Cat amount | [mg] | 15 | 15 |
| Bulk |  |  |  |
| Ethylene fed | [g] | 19.2 | 19.4 |
| Gas phase polymerisation |  |  |  |
| Time | [min] | — | 162 |
| Ethylene/propylene in feed | [mol/mol] | — | 0.085 |
| Ethylene fed | [g] | — | 25 |
| Propylene fed | [g] | — | 459 |
| Yield | [g] | 311 | 600 |
| Split: Bulk/gas phase material | [weight/weight] | 100/0 | 52/48 |
| Polymer |  |  |  |
| Ethylene | [wt.-%] | 4.0 | 6.9 |
| Ethylene in gas phase material | [wt.-%] | — | 10.0 |
| Randomness | [%] | 74.1 | 64.4 |
| XS | [wt.-%] | 9.3 | 28.1 |
| MFR | [g/10 min] | 13.2 | 6.8 |
| Flowability | [seconds] | — | 3.8 |

TABLE 2B

Polymerisation and Properties of the random polypropylene, comparative examples

|  |  | Ex 6 1. stage | Ex 6 2. stage | Ex 7 1. stage | Ex 7 2. stage |
|---|---|---|---|---|---|
| Catalyst type |  | Ex 3 | Ex 3 | Ex 4 | Ex 4 |
| Cat amount | [mg] | 16.2 | 16.2 | 12.4 | 12.5 |
| Bulk polymerisation |  |  |  |  |  |
| Ethylene fed | [g] | 19.7 | 19.3 | 19.2 | 19.3 |
| Gas phase polymerisation |  |  |  |  |  |
| Time | [min] | — | 77 | — | 65 |
| Ethylene/propylene in feed | [mol/mol] | — | 0.085 | — | 0.085 |
| Ethylene fed | [g] | — | 26.2 | — | 25 |
| Propylene fed | [g] | — | 467 | — | 434 |
| Yield | [g] | 318 | 630 | 282 | 598 |
| Split: Bulk/gas phase | [weight/weight] | 100/0 | 50/50 | 100/0 | 50/50 |
| Polymer |  |  |  |  |  |
| Ethylene | [wt.-%] | 3.7 | 6.3 | 3.7 | 6 |
| Ethylene in gas phase | [wt.-%] | — | 8.9 | — | 8.3 |
| Randomness | [%] | 75.7 | 66.9 | 75.6 | 67.7 |
| XS | [wt.-%] | 7.6 | 23.3 | 6.7 | 22 |
| MFR | [g/10 min] | 7.5 | 5.8 | 5.0 | 4.0 |
| Flowability | [seconds] | — | 5.7 | — | 2.3 |

As can be seen from the results, the flowability of the polymer is very good in polymers produced with the catalyst of the invention, in spite of the high ethylene content and high XS values compared to the ones produced with the prior art catalyst (example 6), and also at least, if not even better compared to the polymers produced with the catalyst of example 4, which contains as well nanoparticles, but is prepared with a different method.

Heterophasic Polymerisations

Example 8

All raw materials were essentially free from water and air and all material additions to the reactor and the different steps were done under inert conditions in nitrogen atmosphere. The water content in propylene was less than 5 ppm.

Stage 1: Bulk Polymerisation Step

The polymerisation was done in a 5 litre reactor, which was heated, vacuumed and purged with nitrogen before taken into use. 276 μl TEA (tri ethyl Aluminium, from Witco used as received), 47 μl donor Do (dicyclo pentyl dimethoxy silane, from Wacker, dried with molecular sieves) and 30 ml pentane (dried with molecular sieves and purged with nitrogen) were mixed and allowed to react for 5 minutes. Half of the mixture was added to the reactor and the other half was mixed with 14.9 mg highly active and stereo specific Ziegler Natta catalyst of example 2 of the invention. After about 10 minutes was the ZN catalyst/TEA/donor D/pentane mixture added to the reactor. The Al/Ti molar ratio was 250 and the Al/Do molar ratio was 10. 200 mmol hydrogen and 1400 g were added to the reactor. The temperature was increased from room temperature to 80° C. during 16 minutes. The reaction was stopped, after 30 minutes at 80° C., by flashing out unreacted monomer. Finally the polymer powder was taken out from the reactor and analysed and tested. The MFR of the product was 13.5. The other polymer details are seen in table 3A. The result from the flowability test was 2.8 seconds.

Stage 2: Gas Phase Reactor

This example was done in accordance with example 9, but after having flashed out unreacted propylene after the bulk polymerisation step the polymerisation was continued in gas phase (rubber stage). After the bulk phase the reactor was pressurised up to 5 bar and purged three times with a 0.75 mol/mol ethylene/propylene mixture. 200 mmol hydrogen was added and temperature was increased to 80° C. and pressure with the aforementioned ethylene/propylene mixture up to 20 bar during 14 minutes. Consumption of ethylene and propylene was followed from scales. The reaction was allowed to continue until in total 356 g of ethylene and propylene had been fed to the reactor. MFR of the final product was 4.1 and XS was 43.8 wt.-%. The polymer powder showed almost no stickiness, although a polymerisation time in at the second stage was long (85 min) This can be also seen as a reasonably good flowability result. The result from the flowability test was 10.4 seconds. Other details and results are seen in table 3A Example 9

After the first stage of example 8 the polymerisation was continued as in example 8 however with a shorter polymerisation time (45 min) Details and results are seen in table 3A.

Example 10

The procedure of example 8 was repeated at the first and second stage, however, catalyst of example 4 (comparative) was used. Other details and results can be seen in table 3B. Other details and results can be seen in table 3B.

Example 11

The procedure of example 8 was repeated at the first and second stage, however, catalyst of example 3 (comparative) was used. Other details and results can be seen in table 3B.

Example 12

The procedure of example 11 was repeated, however using at 2. Stage conditions resulting in higher amount of XS.

TABLE 3A

Polymerisation and Properties of the heterophasic polypropylene

| Example | | Ex 8 1. stage | Ex 8 2. stage | Ex 9 2. stage |
|---|---|---|---|---|
| Catalyst type | | Ex 2 | Ex 2 | Ex 2 |
| Cat amount | [mg] | 12.4 | 12.4 | 12.6 |
| Bulk polymerisation | | | | |
| Temperature | [° C.] | 80 | 80 | 80 |
| Time | [min] | 30 | 30 | 30 |
| Gas phase polymerisation | | | | |
| Hydrogen | [mmol] | — | 200 | 200 |
| Time | [min] | — | 85 | 45 |
| Ethylene/propylene in feed | [mol/mol] | — | 0.75 | 0.75 |
| Ethylene fed total | [g] | — | 122 | 103 |
| Propylene fed total | [g] | — | 234 | 211 |
| Yield | [g] | 251 | 465 | 439 |
| Polymer product | | | | |
| Ethylene in polymer | [wt.-%] | — | 20.4 | 17.4 |
| XS | [wt.-%] | 1.6 | 43.8 | 39.9 |
| AM | [wt.-%] | — | 42.6 | 38.3 |
| Ethylene in AM | [wt.-%] | — | 40.4 | 40.1 |
| MFR | [g/10 min] | 13.5 | 4.1 | 5.2 |
| Flow average | [seconds] | 2.8 | 10.4 | 7.5 |

TABLE 3B

Polymerisation and Properties of the heterophasic polypropylene, comparative examples

| | | Example | | | | |
|---|---|---|---|---|---|---|
| | | Ex 10 1. stage | Ex 10 2. stage | Ex 11 1. stage | Ex 11 2. stage | Ex 12 2. stage |
| Catalyst type | | | | | | |
| Cat amount | [mg] | 11.7 | 12.7 | 16.5 | 16.5 | 16.5 |
| Bulk polymerisation | | | | | | |
| Temperature | [° C.] | 80 | 80 | 80 | 80 | 80 |
| Time | [min] | 30 | 30 | 30 | 30 | 30 |
| Gas phase polymerisation | | | | | | |
| Hydrogen | [mmol] | — | 180 | — | 90 | 90 |
| Time | [min] | — | 61 | — | 21 | 32 |
| Ethylene/propylene in feed | [mol/mol] | — | 0.75 | — | 0.75 | 0.75 |
| Ethylene fed total | [g] | — | 144 | — | 79 | 106 |
| Propylene fed total | [g] | — | 293 | — | 164 | 206 |
| Yield | [g] | 274 | 606 | 299 | 436 | 519 |
| Polymer product | | | | | | |
| Ethylene in polymer | [wt.-%] | — | 19.1 | — | 10.7 | 13.9 |
| XS | [wt.-%] | 1.5 | 47.8 | 1.2 | 25.6 | 34.9 |
| AM | [wt.-%] | — | 46.2 | — | 25 | 34 |
| Ethylene in AM | [wt.-%] | — | 34.7 | — | 36 | 37.1 |
| MFR | [g/10 min] | 8.4 | 3.6 | 8.9 | 5.1 | 4.3 |
| Flow average | [seconds] | 2.0 | 11.6 | 1.6 | 11.4 | too sticky |

As can be seen from the results the polymers produced with the catalyst of the invention had a good flowability, even with a high XS values indicating a high rubber (elastomer) amount. The results are clearly better than those produced with the comparative catalyst 3 (compact catalyst without any solid material). The results show that high ethylene amount is not possible to incorporate into a polymer (with high XS) produced with catalyst of example 3 without serious stickiness problems. Upper limit for XS is about 25 wt.-%. Further, results obtained with the catalyst of the invention are approximately at the same level or even better than those obtained with a catalyst of example 4.

The invention claimed is:

1. Process for the preparation of a catalyst being in the form of solid particles comprising the steps of
   (a1) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);
   (b1) adding to said solution solid material (SM) obtaining a suspension (S1), said solid material (SM)
      (i) does not comprise catalytically active sites,
      (ii) has a specific surface area below 500 $m^2/g$, and
      (iii) has a mean particle size below 200 nm;
   (c1) combining said suspension (S1) at a temperature of at least 50° C. with at least one transition metal compound (CT) resulting in a precipitation of said catalyst being in the form of a solid particle, wherein said transition metal compound (CT) is selected from one of the groups 4 to 10 of the periodic table (IUPAC) or a compound of actinide or lanthanide; and
   (d1) optionally separating said catalyst; said catalyst being in the form of solid particles, which
      (i) have a specific surface area of less than 20 $m^2/g$, and
      (ii) contain said solid material (SM).

2. Process according to claim 1, wherein the transition metal compound (CT) is dissolved in an organic liquid reaction medium (OL2).

3. Process for the preparation of a catalyst being in the form of solid particles comprising the steps of:
   (a2) preparing a solution (A) of a complex (C) of a metal which is selected from one of the groups 1 to 3 of the periodic table (IUPAC) and an electron donor (E) by reacting a compound (CM) of said metal with said electron donor (E) or a precursor (EP) thereof in an organic liquid reaction medium (OL1);

(b2) adding solid material (SM) to at least one transition metal compound (CT), said transition metal compound (CT) is selected from one of the groups 4 to 10 of the periodic table (IUPAC) or a compound of actinide or lanthanide, obtaining a suspension (S2), said solid material (SM)
  (i) does not comprise catalytically active sites
  (ii) has a specific surface area below 500 $m^2/g$, and
  (iii) has a mean particle size below 200 nm (c2) combining said solution (A) with said suspension (S2) at a temperature of at least 50° C. resulting in a precipitation of said catalyst being in the form of solid particles; and (d2) optionally separating said catalyst;

said catalyst being in the form of solid particles which
  (i) have a specific surface area of less than 20 $m^2/g$, and
  (ii) contain said solid material (SM).

4. Process according to claim 3, wherein the transition metal compound (CT) is dissolved in an organic liquid reaction medium (OL2).

5. Process according to claim 1, wherein the catalyst being in the form of solid particles is insoluble in the organic liquid reaction medium (OL1), in the organic liquid reaction medium (OL2) or in a mixture of OL1 and OL2 at a temperature of at least 50° C.

6. Process according to claim 1, wherein the obtained catalyst in form of solid particles comprises
  (a) a transition metal compound which is selected from one of the groups 4 to 10 of the periodic table (IUPAC) or a compound of actinide or lanthanide,
  (b) a metal compound which is selected from one of the groups 1 to 3 of the periodic table (IUPAC), and
  (c) solid material, wherein the solid material
    (i) does not comprise catalytically active sites,
    (ii) has a specific surface area below 500 $m^2/g$, and
    (iii) has a mean particle size below 200 nm, preferably below 100 nm.

7. Process according to claim 1, wherein the solid particles
  (a) are precpitated solid particles and/or
  (b) are free of any precipitating agents and/or
  (c) have a particle size distribution of a SPAN value of at least 2.0.

8. Process according to claim 1, wherein the particles:
  (a) have a specific surface area of less than 20 m2/g,
  (b) have a particle size distribution of a SPAN value of at least 2.0,
  (c) optionally are free of any precipitating agents,
  (d) comprise a transition metal compound which is selected from one of the groups 4 to 10 of the periodic table (IUPAC) or a compound of actinide or lanthanide,
  (e) comprise a metal compound which is selected from one of the groups 1 to 3 of the periodic table (IUPAC), and
  (f) comprise solid material, wherein the solid material
    (i) does not comprise catalytically active sites,
    (ii) has a specific surface area below 500 $m^2/g$, and
    (iii) has a mean particle size below 200 nm.

9. Catalyst in form of solid particles, wherein the particles
  (a) have a specific surface area of less than 20 $m^2/g$,
  (b) have a particle size distribution of a SPAN value of at least 2.0,
  (c) optionally are free of any precipitating agents,
  (d) comprise a transition metal compound which is selected from one of the groups 4 to 10 of the periodic table (IUPAC) or a compound of actinide or lanthanide,
  (e) comprise a metal compound which is selected from one of the groups 1 to 3 of the periodic table (IUPAC), and
  (f) comprise solid material, wherein the solid material
    (i) does not comprise catalytically active sites,
    (ii) has a specific surface area below 500 $m^2/g$, and
    (iii) has a mean particle size below 200 nm.

10. Catalyst according to claim 9, wherein the solid particles are precipitated solid particles.

11. Catalyst according to claim 9, wherein the solid material does not comprise
  (a) transition metal compounds which are selected from one of the groups 4 to 10 of the periodic table (IUPAC) and
  (b) compounds of actinide or lanthanide.

12. Catalyst according to claim 9, wherein the solid material is selected from the group consisting of inorganic materials, organic materials, preferably polymers, and any combination thereof.

13. Catalyst according to claim 9, wherein the solid material has
  (a) mean particle size of not more than 90 nm and/or
  (b) a specific surface area of below 450 $m^2/g$.

14. Catalyst according to claim 9, wherein the solid particle has
  (a) a specific surface area of less than 10 $m^2/g$ and/or
  (b) a pore volume of less than 1.0 ml/g and/or
  (c) a mean particle size below 80 μm.

15. Catalyst according to claim 9, wherein the solid particle comprises a compound of formula (I):

$AlR_{3-n}X_n$ (I)

wherein,
R stands for a straight chain or branched alkyl or alkoxy group having 1 to 20 carbon atoms,
X stands for halogen, and
n stands for 0, 1, 2 or 3.

16. Catalyst according to claim 9, wherein the solid particles are obtainable by a process as defined in the claims 1 to 8.

17. Use of a catalyst as defined in claim 9, in a polymerization process of polypropylene, in particular heterophasic propylene copolymer or randon propylene copolymer.

18. Process for the preparation of polypropylene, in particular of heterophasic propylene copolymer or randon propylene copolymer, using a catalyst as defined in claim 9.

* * * * *